United States Patent [19]
Devanathan et al.

[11] Patent Number: 5,569,434
[45] Date of Patent: Oct. 29, 1996

[54] HYDROCARBON PROCESSING APPARATUS AND METHOD

[75] Inventors: Narasimhan Devanathan, Aurora; Peter J. Klomans, Lockport, both of Ill.; William B. VanderHeyden, Los Alamos, N.M.; Robert D. Buttke, Houston, Tex.

[73] Assignee: Amoco Corporation, Chicago, Ill.

[21] Appl. No.: 321,211

[22] Filed: Oct. 10, 1994

[51] Int. Cl.⁶ ........................................... B01J 8/18
[52] U.S. Cl. ........................ 422/140; 422/225; 422/228; 422/231; 208/143; 208/146
[58] Field of Search ........................... 422/224, 228, 422/231, 225, 140, 143; 208/143, 146

[56] References Cited

U.S. PATENT DOCUMENTS

| | | | |
|---|---|---|---|
| 2,702,434 | 2/1955 | Richardson et al. | 34/57 |
| 3,698,876 | 10/1972 | Gregoli et al. | 23/288 E |
| 4,239,518 | 12/1980 | Yanagioka et al. | 55/223 |
| 4,702,891 | 10/1987 | Li et al. | 422/140 |
| 4,707,340 | 11/1987 | Milligan | 422/140 |
| 4,753,721 | 6/1988 | McDaniel et al. | 208/143 |
| 4,764,347 | 8/1988 | Milligan | 422/113 |
| 4,804,458 | 2/1989 | Buttke et al. | 208/143 |
| 4,874,583 | 10/1989 | Colvert | 422/143 |
| 4,990,241 | 2/1991 | Buttke et al. | 208/143 |
| 5,087,427 | 2/1992 | Quinn et al. | 422/144 |
| 5,173,175 | 12/1992 | Steffens et al. | 208/157 |
| 5,183,641 | 2/1993 | Isaksson | 422/143 |
| 5,215,653 | 6/1993 | Nelson et al. | 208/152 |

FOREIGN PATENT DOCUMENTS

| | | |
|---|---|---|
| 247571 | 6/1912 | Germany. |
| 1623752 | 3/1991 | U.S.S.R.. |

*Primary Examiner*—N. Bhat
*Attorney, Agent, or Firm*—Scott P. McDonald; Richard A. Kretchmer

[57] ABSTRACT

Apparatus and methods useful for introducing feedstock to a chemical reactor are disclosed. The methods and apparatus employ a novel baffle system to mitigate the effects of unwanted momentum components transferred to the reactor liquid mass from the introduced feedstock. Resid hydrotreating processes employing these methods also are disclosed.

17 Claims, 5 Drawing Sheets

HYDROCARBON PROCESSING APPARATUS AND METHOD

FIELD OF THE INVENTION

This invention relates generally to the use of momentum-altering inlet sparger assemblies in chemical reactors, and more particularly to the use of such assemblies in hydroconversion reactors such as those used to hydroprocess heavy, hydrocarbonaceous feedstocks.

BACKGROUND OF THE INVENTION

Modern reactors used to convert heavy hydrocarbonaceous feedstocks such as petroleum residuum ("resid") to lighter, more valuable products often employ slurry-type or ebullated bed hydroconversion processes. In both slurry-type and ebullated bed reactors, feedstock typically is added to a reactor vessel alone or together with hydrogen through an inlet pipe or sparger. The pipe or sparger typically is located in a lower portion of the reactor vessel in a liquid mixing region.

In ebullated bed reactors, a mixture of process liquids and hydrogen from the liquid mixing region is forced upwardly through a distributor plate containing a plurality of bubble-capped risers. Feedstock, hydrogen, and recycled liquid are forced upwardly through the risers to expand a bed of supported catalyst located above the distributor plate. Maintaining the catalyst bed in a properly expanded condition requires that the liquids supporting the bed exhibit a generally symmetric liquid velocity distribution in the expanded bed region of the reactor.

In slurry-type reactors, a distributor plate and bubble-capped risers are not needed to prevent supported catalyst from falling into the liquid mixing region. Nevertheless, many slurry-type reactors resemble ebullated bed reactors in that fresh feedstock, recycled liquids and liquid or colloidal catalyst are mixed together in a liquid mixing region in the lower end of a reactor. The mixture is then forced upwardly through a distributor plate or other device intended to provide a desired liquid velocity distribution in the region of the reactor located above the liquid mixing zone.

Liquids moving upwardly in slurry-type or ebullated bed reactors have a velocity that preferably is equal or nearly equal at all points located within a cross-section of the reactor at a given height. If asymmetries in the reactor velocity profile occur, mixing will not be uniform within the reactor. In ebullated bed reactors, insufficient liquid velocity may prevent the catalyst bed from expanding to the desired height or cause catalyst to accumulate or "slump" in areas of low liquid velocity. Catalyst slumping can in turn result in the formation of reactor hot spots and coke accumulation.

Various structures have been employed to minimize deviations in the liquid velocity profile of slurry-type or ebullated bed reactors. For example, U.S. Pat. No. 4,444,653 to Euzen discloses a plurality of inlet spargers which disperse a reactor feedstock through a plurality of relatively small discharge orifices located along the spargers. While these sparger designs may be beneficial in some applications, the use of spargers with large numbers of relatively small holes such as those disclosed by Euzen can be problematic when the reactor charge is a heavy hydrocarbonaceous feedstock such as a petroleum resid, as relatively small holes can easily become plugged in a resid hydrotreating environment. Euzen's designs also are subject to the momentum-related problems discussed in depth below.

Another method for improving the flow distribution of liquids in an ebullated bed reactor is disclosed in U.S. Pat. No. 4,702,891 to Li. This method employs a radially-symmetric recycle liquid inlet nozzle located along the centerline of a generally cylindrical reactor vessel and in a liquid mixing region below the reactor's distributor plate. Feedstock and hydrogen are introduced into the same region through a ring sparger located above the recycle nozzle. As is common in many such reactors, feedstock appears to be required to enter the reactor in an asymmetric manner because of mechanical constraints inherent in the reactor design. While Li's design may be useful in some instances, our experimental work shows that the use of a ring sparger such as in the Li patent introduces sufficient unwanted horizontal momentum into fluids present below the distributor plate to cause serious deviations in the liquid velocity profile above the distributor plate. Specifically, although Li's horizontal sparger includes downwardly-directed discharge apertures, horizontal motion through the sparger causes the discharged feedstock to retain an undesired horizontal momentum component. As our experimental data will show, this undesired horizontal momentum component can seriously degrade the liquid superficial velocity profile in the reactor region located above the inlet sparger. This effect has been found to occur even though recycled liquids are introduced into the liquid region in a manner which appears to introduce little unwanted recycled liquid momentum components.

What is needed is a means for introducing feedstock into a reactor that minimizes asymmetry in the liquid velocity profile in a reaction zone of the reactor.

SUMMARY OF THE INVENTION

Each aspect of the present invention is based on novel feedstock sparger designs useful in liquid-containing chemical reactors, and particularly useful in resid hydrotreating reactors. These designs exploit our discovery that a liquid velocity profile asymmetry in the reactor can be reduced by minimizing undesired momentum components transferred to the reactor system by entering feedstock.

A first aspect of the invention provides a feedstock inlet sparger assembly for use in a reactor vessel used to react a mixture containing a liquid feedstock. The sparger assembly includes a sparger having at least one discharge aperture for discharging feedstock therethrough into the reactor as well as one or more baffles for reducing the magnitude of an undesired momentum component of feedstock discharged from the sparger. The baffle is located and oriented such that the discharged feedstock impinges on the baffle, thereby reducing or eliminating undesired momentum components introduced into the reactor system by the entering feedstock.

A second aspect of the invention provides a liquid chemical reactor incorporating a momentum-altering feedstock inlet sparger assembly. The reactor includes a reactor vessel; sparger means located within the reactor vessel for discharging feedstock into the reactor through at least one sparger discharge aperture; and baffle means for reducing the magnitude of an undesired momentum component of feedstock discharged from the sparger means. The baffle means is located such that the discharged feedstock impinges on the baffle means to reduce undesired liquid momentum components introduced into the reactor by the entering feedstock.

Another aspect of the invention provides a method for introducing a liquid feedstock into a chemical reactor. The method includes the steps of introducing the liquid feedstock into a liquid mixing region of the reactor through a sparger having at least two discharge apertures and causing the introduced feedstock to impinge against a baffle means to reduce an undesired component of feedstock momentum.

Yet another aspect of the invention provides a method for hydrotreating a resid feedstock in a resid hydrotreating reactor vessel having a liquid reaction zone located above a liquid mixing zone. The method includes the steps of reacting a mixture comprising hydrogen, a liquid feedstock, and a catalyst in the liquid reaction zone; introducing unreacted liquid feedstock into the liquid mixing region of the reactor through a sparger having at least two discharge apertures; impinging the introduced feedstock against a baffle means to reduce an undesired component of feedstock momentum; separating a liquid recycle stream from the reacted mixture; and introducing the recycle stream into the liquid mixing zone.

DETAILED DESCRIPTION OF THE INVENTION

Each of the inlet sparger assemblies and related processes discussed herein can improve the superficial liquid velocity distribution in a slurry-type or ebullated bed resid hydrotreating reactor or other chemical reactor. The spargers assemblies improve the velocity distribution by damping or redirecting feedstock having undesired momentum components introduced into the feedstock by the feedstock's passage through the sparger. In each case, discharged feedstock impinges on a surface of a baffle oriented in a plane which is non-parallel to the direction of the undesired momentum component of the discharged feedstock. While the spargers and processes discussed below are intended for use in an ebullated bed or slurry-type resid hydrotreating reactor, the invention is also useful in other types of chemical reactors.

Figure 1:
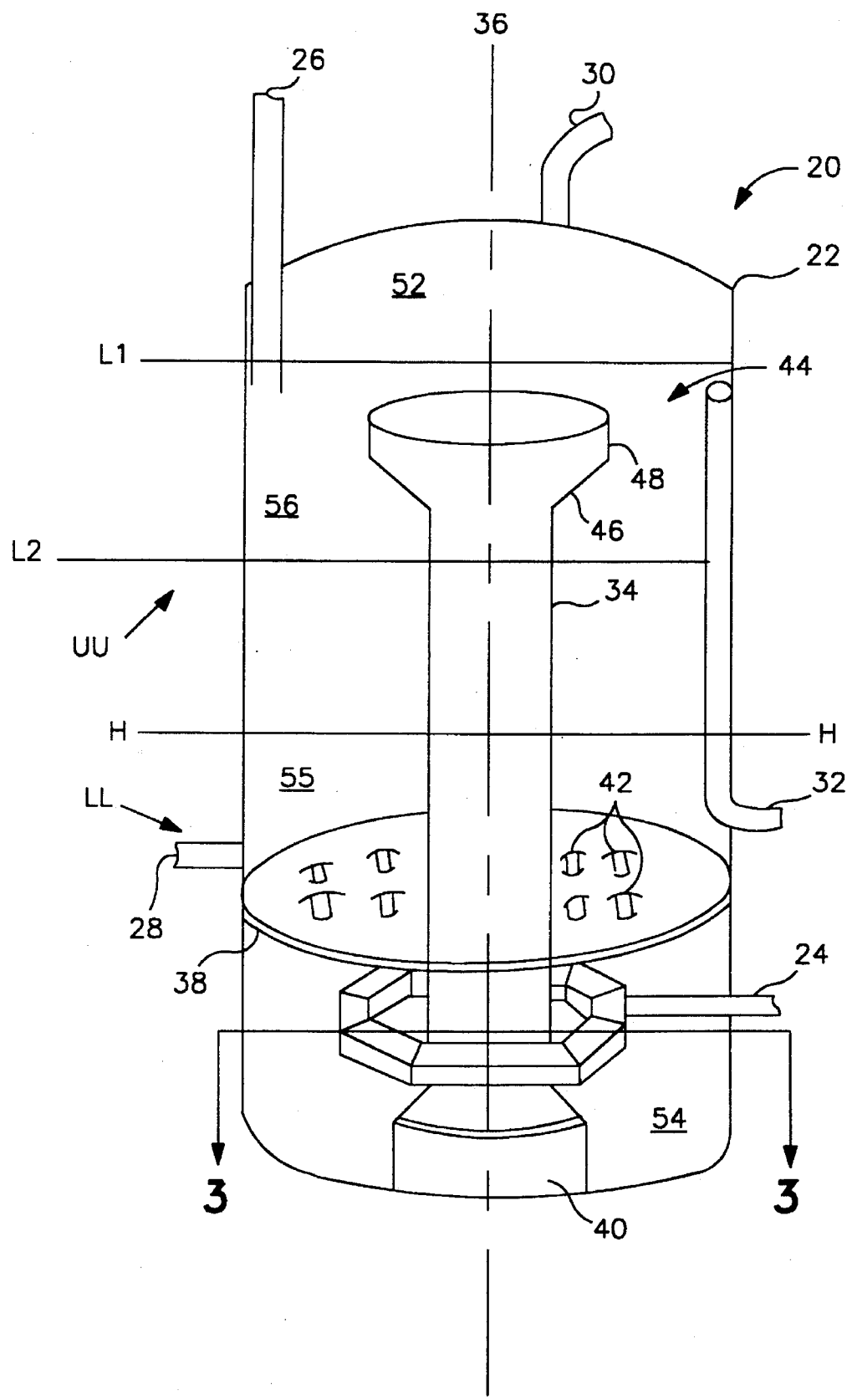
FIG. 1 is a simplified sectional perspective view of a resid hydrotreating reactor incorporating a momentum-altering feedstock inlet sparger assembly in accordance with the present invention.

Turning to FIG. 1, an ebullated bed hydrotreating reactor 20 includes a reactor vessel 99 penetrated by a feedstock inlet sparger assembly 24, a catalyst inlet 26, a catalyst outlet 28, an optional vapor outlet 30, and a fluid product outlet 32. If desired, vapor outlet 30 may be omitted, with vapor and liquid products withdrawn from the vessel together through product outlet 32.

Internal to vessel 22 is a recirculation downcomer 34 located along a radial axis of symmetry 36 of vessel 22. Downcomer 34 extends downwardly through a distributor plate 38 and terminates into an ebullation or recirculation pump 40 located at the lower end of downcomer 34. Distributor plate 38 includes a plurality of bubble-capped risers 42 which allow upward liquid flow while preventing the downward flow of liquid and catalyst.

A recirculation pan 44 is attached to downcomer 34 at downcomer 34's upper end. Pan 44 includes a lower, frustoconical portion 46 attached to downcomer 34 at the lower end of portion 46 and an upper, generally cylindrical pan portion 48 whose upper edge 50 is located typically below a liquid level L1 during operation. A vapor space 52 is located above liquid level L1 at the upper end of vessel 22.

The reactor of FIG. 1 is generally representative of vertically-oriented slurry-type and ebullated reactors having an upper half portion corresponding to the reactor region UU located above line H in FIG. 1, a lower half-portion corresponding to the reactor region LL located below line H in FIG. 1, an inlet sparger located in lower half portion LL, and in which total liquid mass flow in the reactor is in a generally vertical direction. These reactors often include a means for recycling partially-upgraded materials from region UU to LL such as downcomer 34. It should be noted that the use of bubble-capped risers 42 in distributor plate 38 is highly preferred, but that in some reactors, a suitable distributor plate may simply comprise a plate having a plurality of slots or other apertures.

During operation, feedstock and hydrogen are added to a liquid mixing region 54 through momentum-altering feedstock inlet sparger assembly 24. Alternatively, hydrogen may be added to vessel 22 through a separate sparger or pipe. The added feedstock and hydrogen are mixed with recirculated reactor liquids drawn downwardly through downcomer 34 by ebullation pump 40. The mixed liquids and hydrogen are forced upwardly through bubble-capped risers 42. The upward liquid velocity of fluids forced through bubble-capped risers 42 expands a bed of supported catalyst to level L2, creating a catalyst-containing liquid region or reaction zone 55 in which feedstock and recirculated liquids are catalytically upgraded to lighter, more valuable products.

A freeboard or catalyst-free liquid region 56 exists between level L1 and level L2. Freeboard region 56 is catalyst-free because the liquid superficial velocity of fluids introduced through distributor plate 38 is insufficient to expand catalyst-containing region 55 above level L2.

Proper operation of reactor 20 depends in large part on achieving a desired liquid superficial velocity distribution within catalyst-containing region 55. If a proper distribution is not obtained, catalyst may tend to accumulate or "slump" onto distributor plate 38 below regions of relatively low velocity. Such catalyst accumulations can result in reactor coking and "hot spots." Our research has shown that at the feedstock flow rates typically used in ebullated bed hydrotreating reactors undesired momentum components imparted to feedstock introduced in liquid mixing region 54 can substantially disturb the liquid velocity profile in catalyst-containing region 55. Spargers in accordance with the present invention employing one or more baffles such as those disclosed in FIGS. 2–5 below to minimize undesired momentum components which may disturb the liquid velocity profile in catalyst-containing region 55.

Figure 2A:
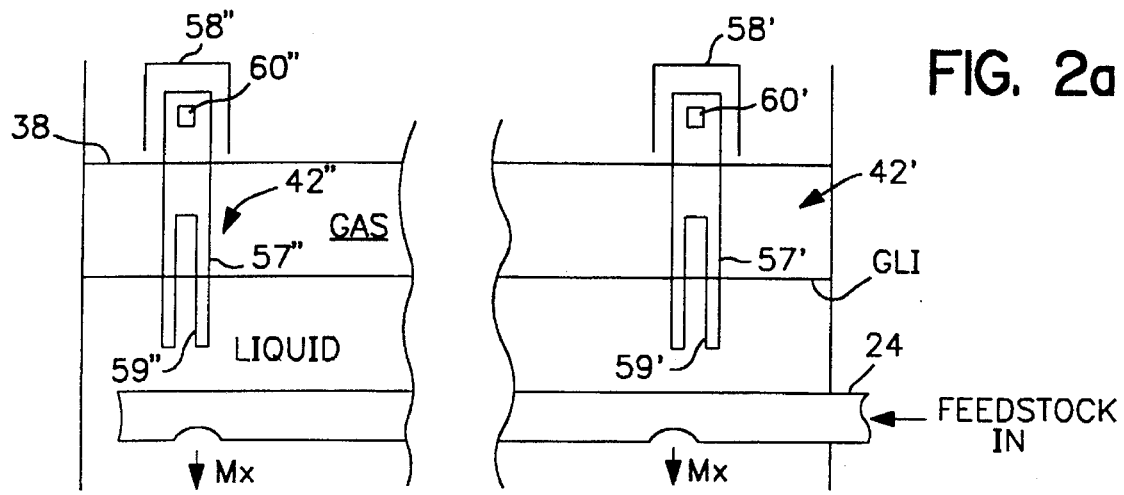
FIGS. 2a, b and c are simplified sectional views of a bottom portion of a reactor which are useful in understanding the concept underlying the present invention.

FIGS. 2a, b and c are simplified sectional views of a bottom portion of reactor 20 and are useful in understanding the concept underlying the present invention. In these FIGS., bubble-capped risers 42' and 42" are located above feedstock inlet sparger 24 on feedstock inlet and outlet sides of reactor 20, respectively. Risers 42' and 42" include vertical riser portions 57' and 57" which pass through distributor plate 38 and have bubble caps 58' and 58" located at their upper ends. Vertical riser portions 57' and 57" include lower slots 59' and 59" and upper slots 60' and 60", respectively. During operation, gas accumulates immediately under distributor plate 38, forming a gas-liquid interface GLI. Interface GLI occurs partway up lower slots 59' and 59".

FIG. 2a illustrates an idealized case in which feedstock exits sparger 24 and has only a desired downward momentum component $M_x$ associated with the exiting feedstock. Because no undesired momentum components are imparted to the exiting feedstock, interface GLI occurs at approximately the same height on lower slots 59' and 59", and therefore about the same relative fractions of liquid and gas enter lower slots 59' and 59". When the same relative fractions of liquid and gas enter slots 59' and 59", the local liquid velocity above distributor plate 38 above risers 42' and 42" is about the same.

Figure 2B:
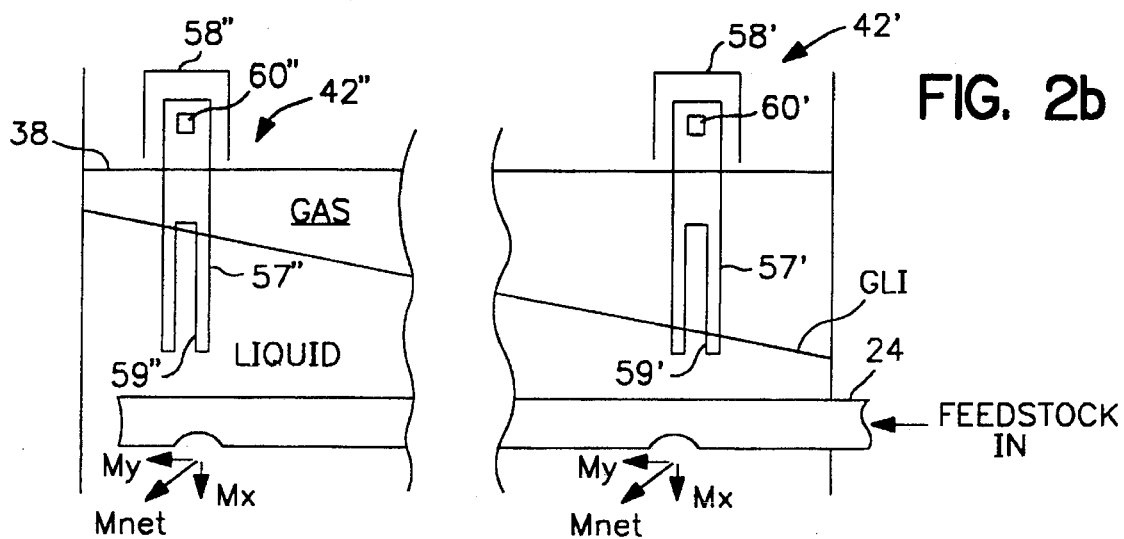

FIG. 2b illustrates how the presence of undesired feedstock momentum components affects the liquid velocity distribution above distributor plate 38. In this case, feedstock exiting sparger 24 contains a downward momentum component $M_x$ as well as a horizontal momentum component $M_y$ imparted to the feedstock as the feedstock travels through sparger 24. The sum of $M_x$ and $M_y$'s a net momentum in the direction of arrow $M_{net}$. The net momentum causes jetting of fluid which drags and tilts interface GLI upward at the outlet side of reactor 20. The tilted interface means that a larger fraction of lower slot 59' is exposed to gas than lower slot 59", thereby causing more gas to enter slot 59' relative to slot 59". This in turn causes the local liquid velocity to be higher above riser 59' than above riser 59", resulting in the velocity distribution shown in Curve A of FIG. 7, which is discussed in detail later in connection with Example 1.

Figure 2C:
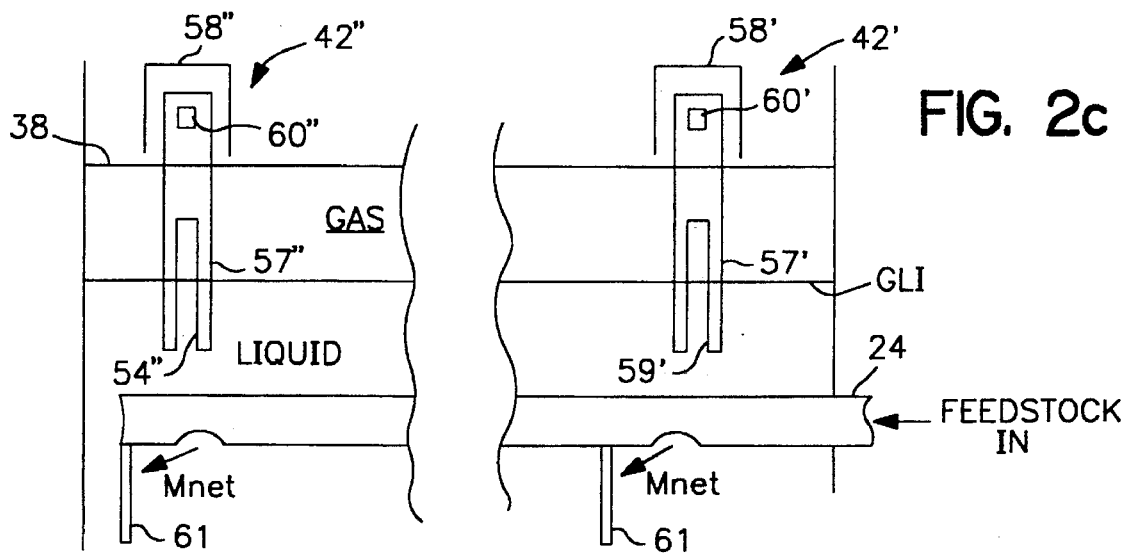

In FIG. 2c, momentum-altering surfaces or baffles 61 are installed immediately downstream from the points at which feedstock exits sparger 24. Because the exiting feedstock has momentum $M_{net}$, the feedstock impinges on baffles 61, which redirect the momentum of the exiting feedstock downwardly and/or otherwise randomize the momentum so that interface GLI is no longer dragged and tilted by jetting fluid as shown in FIG. 2b. As a result, the local liquid velocity distribution above distributor plate 38 more closely resembles that shown in Curve B of FIG. 7, discussed in detail later in connection with Example 2.

Figure 3:
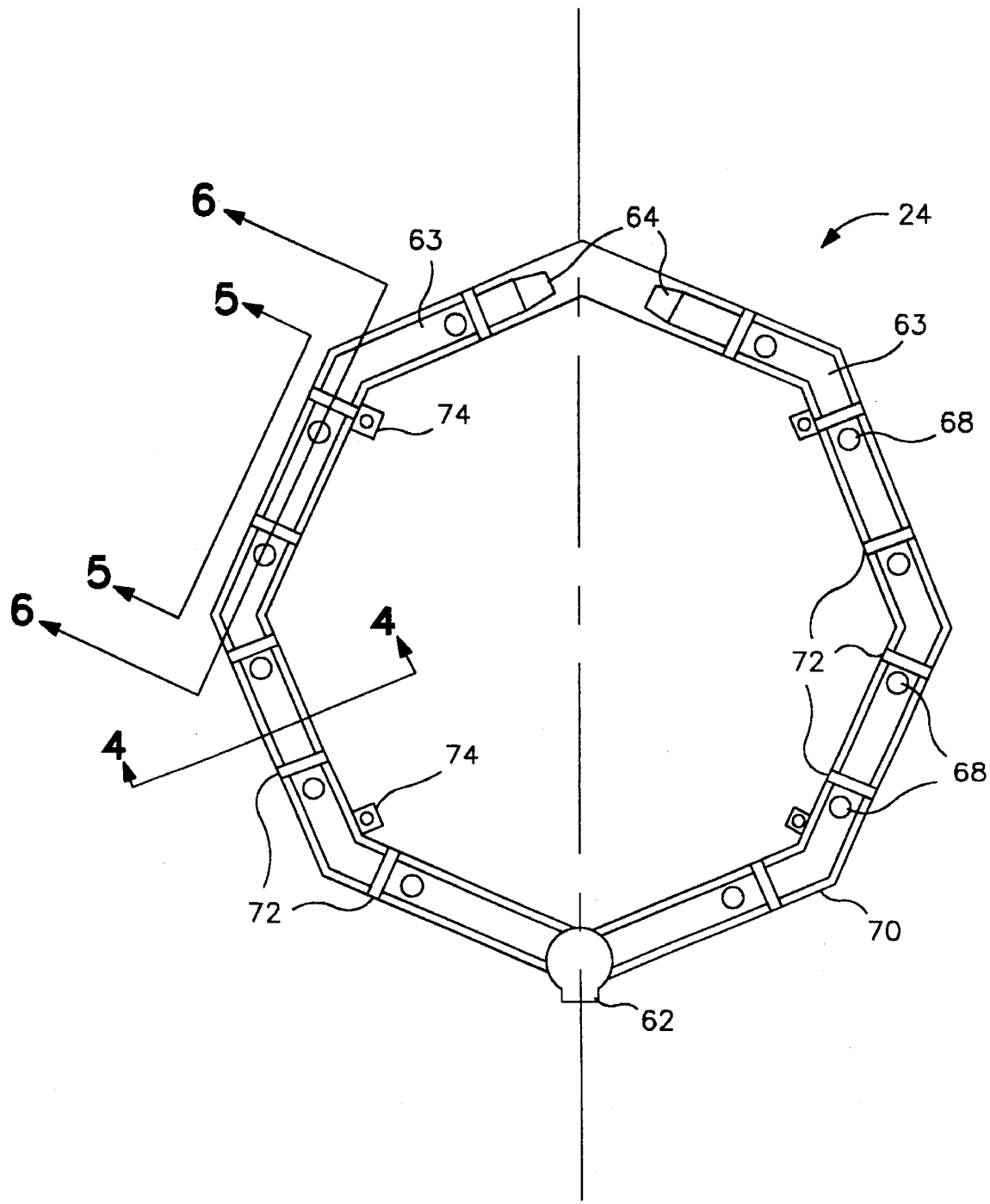
FIG. 3 is a bottom plan view of the feedstock inlet sparger assembly shown in FIG. 1 taken along line 3—3 of FIG. 1.

A practical application of the concepts just explained is shown in FIGS. 3–6. FIG. 3 depicts a momentum-altering feedstock inlet sparger assembly 24 which includes a feedstock inlet 62 and a pair of sparger arms 63. Each arm 63 terminates in a sparger outlet nozzle 64 and contains a plurality of downwardly oriented sparger outlet apertures 68 located symmetrically along the lower surfaces of arms 63. A sparger skirt 70 (depicted and discussed in detail in conjunction with FIGS. 4–6) surrounds the sides and top of sparger arms 63. Skirt 70 traps and redistributes in a more uniform manner gas exiting sparger 24. Fitted within skirt 70 around arms 63 are a plurality of generally vertical momentum-directing baffles 72. Baffles 72 are located immediately downstream of each outlet aperture 68. During operation, feedstock exits apertures 68 into liquid mixing region 54. Feedstock undergoes a large pressure drop in sparger 24, and feedstock exiting apertures 68 has both a desired downward momentum component and an undesired horizontal momentum component which was introduced as the feedstock traveled horizontally through sparger arms 63. The undesired horizontal momentum component causes the discharged feedstock to impinge on baffles 72. As the feedstock strikes baffles 72, the undesired horizontal momentum component is dissipated and/or redirected, thereby preventing the horizontal momentum component from interfering with the upward superficial liquid velocity profile in the region above distributor plate 38.

Also visible in FIG. 3 are a plurality of mounting lugs 74 which are attached to skirt 70 and are useful for mounting sparger assembly 24 with vessel 22.

Figure 4:
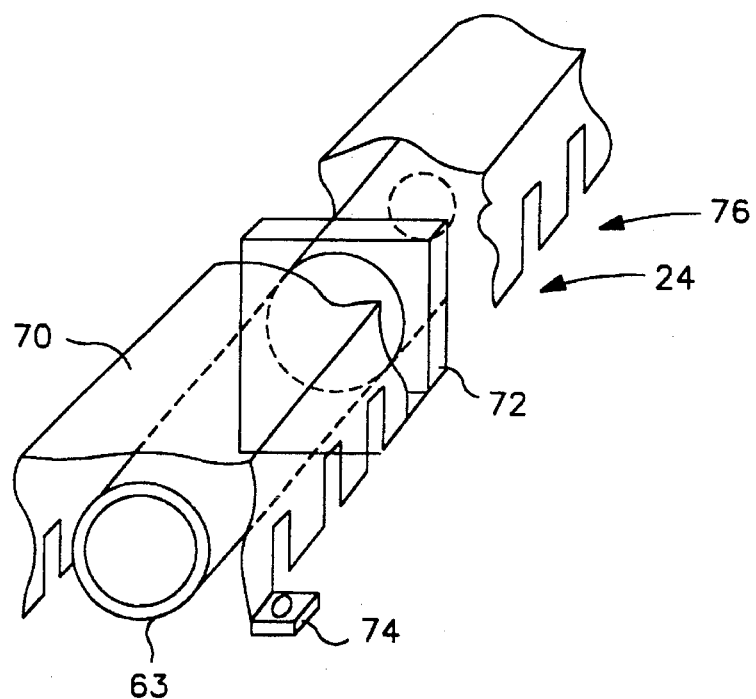
FIG. 4 is a partial perspective view of the sparger assembly shown in FIG. 3 taken along line 4—4 of FIG. 3.
Figure 5:
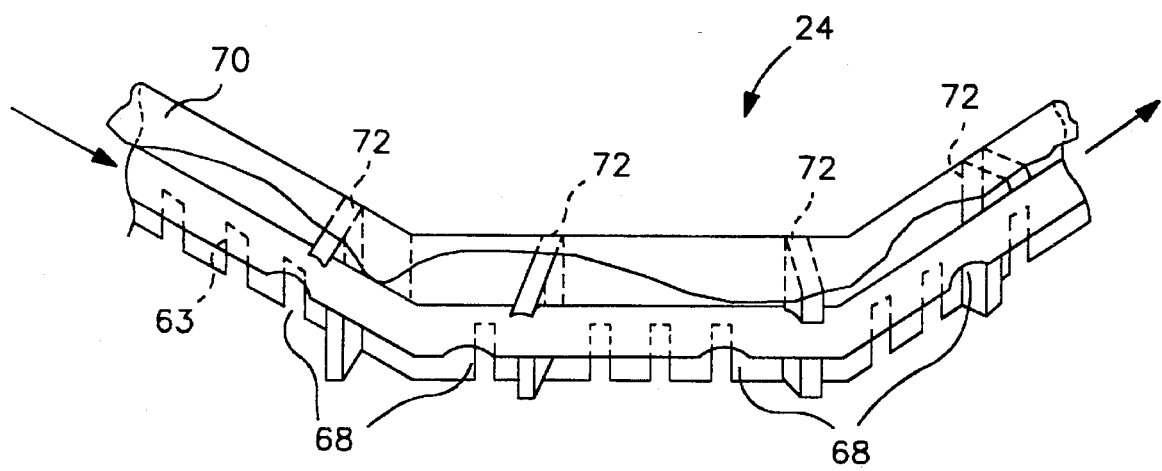
FIG. 5 is a sectional perspective view of the sparger assembly shown in FIG. 3 taken along line 5—5 of FIG. 3.
Figure 6:
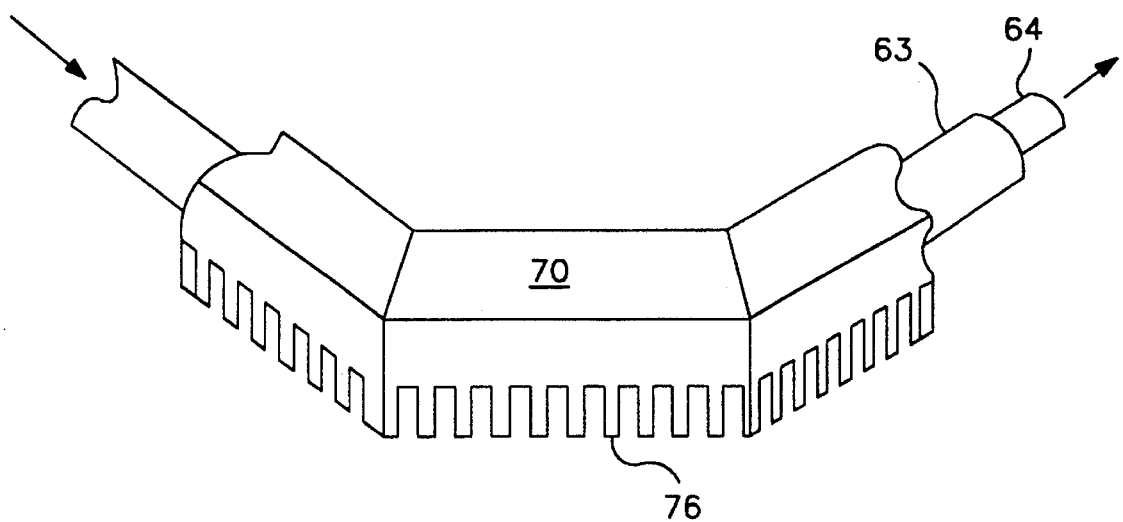
FIG. 6 is a perspective view of the sparger assembly shown in FIG. 3 taken along line 6—6 of FIG. 3.

FIGS. 4, 5 and 6 are sectional perspective views of sparger assembly 24 taken along lines 4—4, 5—5 and 6—6 of FIG. 3, respectively. FIG. 4 shows that baffle 72 is attached at its periphery to the inner surface of skirt 70 and that it is attached to sparger arm 63 around the outer surface of arm 63. Also visible in FIGS. 4 and 5 but best viewed in the perspective view of FIG. 6 is a slotted skirt edge 76. Slotted edge 76 promotes distribution of feedstock and hydrogen radially inwardly and outwardly through the skirt slots in directions generally perpendicular to the undesired horizontal momentum component.

The cooperation of skirt 70, slotted edge 76, and baffles 72 results in a particularly effective sparger assembly as demonstrated by the following Examples.

EXAMPLE 1

In Example 1, a cold flow pilot plant was used to measure the liquid superficial velocity profile present in a reactor employing a sparger assembly like the one shown in FIGS. 1 and 3–6 but lacking the baffle plates used to redirect feedstock exiting apertures 68. The cold flow pilot plant is a one-quarter scale model of a single resid hydrotreating reactor of the type disclosed in our U.S. Pat. No. 4,753,721, the disclosure of which is hereby incorporated by reference. The pilot plant reactor vessel is a three foot diameter clear cylinder. The bottom portion of the cylinder includes a distributor plate fitted with 110 bubble-capped risers. The reactor vessel includes taps through which pitot tubes may be introduced for measuring the liquid velocity at various radial locations within the reactor.

Kerosene and nitrogen were used to simulate the oil and hydrogen phases normally present in a resid hydrotreating reactor. Catalyst extrudates were not added to the reactor to simplify testing. A liquid flow rate of 60 gallons per minute was introduced into the sparger, corresponding to a feedstock liquid velocity of 0.02 feet per second in a full scale reactor. Gas was introduced at a rate of 40 SCFM which corresponds to a gas addition rate of 2400 SCFM in the full-sized reactor. The feed was introduced through an inlet sparger of the type disclosed in our '721 patent, which corresponds to the inlet sparger assembly like the one shown in FIGS. 1 and 3 through 6 but lacks the baffle plates used to redirect flow exiting the sparger discharge apertures.

Figure 7:
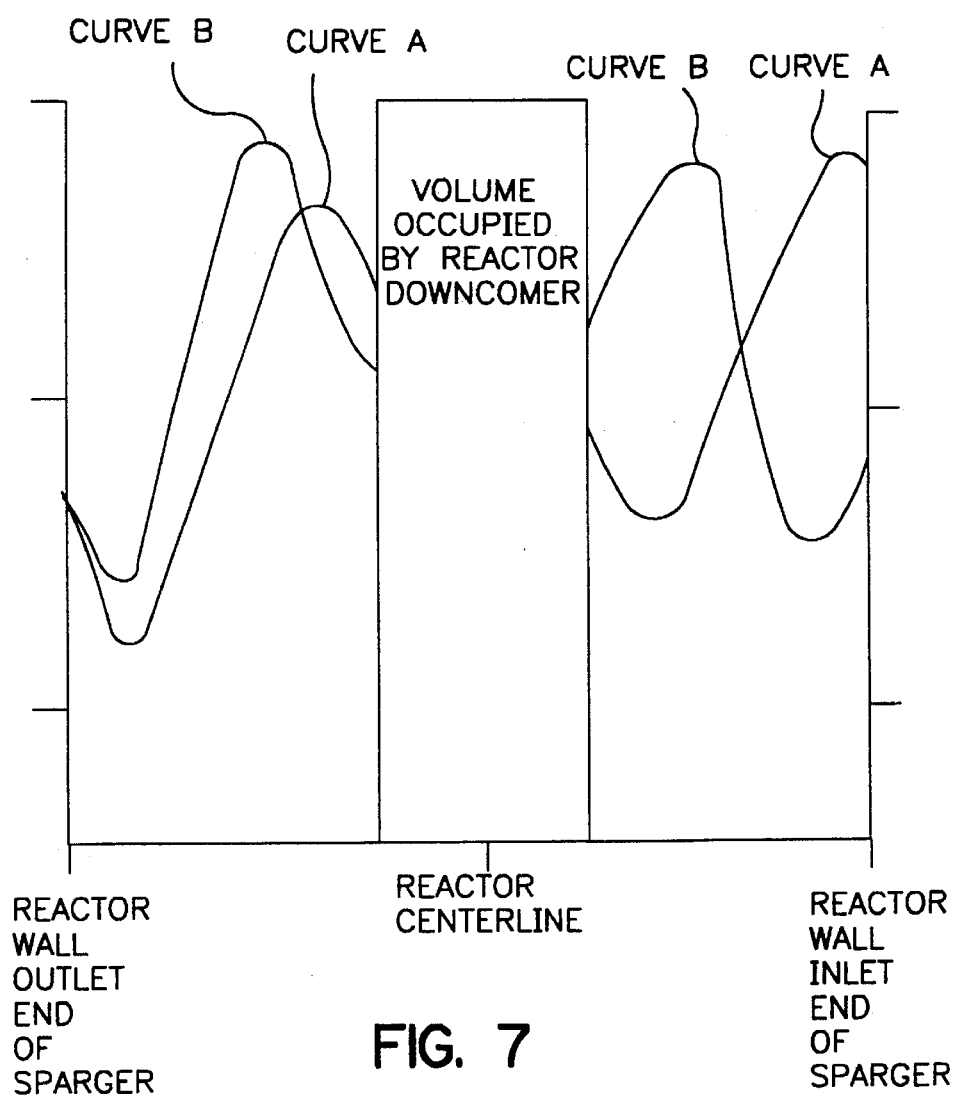
FIG. 7 is a graphical representation of the liquid velocity distribution of a reactor employing a prior art feedstock distribution sparger compared to the liquid velocity distribution of a reactor employing a sparger assembly in accordance with the present invention.

Curve A of FIG. 7 is a plot of the distribution of liquid velocity during the above-described test taken in a reactor region located above the distributor plate in a vertical plane containing centerline CL of FIG. 3. The data shows that the velocity of liquid near the reactor wall on the inlet (upstream) side of the sparger assembly greatly exceeded the velocity near the wall at the outlet (downstream) side of the sparger assembly. It is believed that the asymmetry in velocity distribution shown on Curve A is attributable to jetting of liquid and gas in the forward direction as liquid and gas exit the sparger apertures. This jetting apparently drags and lifts the liquid gas interface on the side of the reactor distal from the sparger inlet, leading to an upflow along the reactor wall on the feed inlet side of the reactor and a downflow along the opposite reactor wall.

EXAMPLE 2

In this Example, a test was conducted identical to the one discussed above in Example 1, except that the sparger included baffles of the type shown in FIGS. 3–6 above. Curve B on FIG. 7 shows the liquid velocity distribution obtained with the sparger built in accordance with the present invention. As can be seen by comparing Curves A and B on FIG. 7, the liquid velocity profile is much more symmetric around the reactor centerline.

The invention is, of course, useful in reactor configurations other than those discussed above. For any given reactor and sparger assembly, the benefits of a momentum-altering sparger assembly in accordance with the present invention are expected to become more apparent as the ratio of feedstock flow to total liquid flow through the reactor's reaction zone increases. This effect should occur because the larger the unwanted feedstock momentum component, the less likely that component will be overwhelmed by total liquid flow. For example, if the feedstock flow used in the reactor described in conjunction with FIG. 1 was doubled while the recirculation flow in the reactor remained constant, it would be expected that the magnitude of the asymmetry in the superficial liquid velocity profile would increase. As a rule of thumb, the invention is believed to be useful in any reactor where the ratio of flow through a sparger to the total liquid flow through the reactor's reaction zone exceeds 1 to 10, and believed to be especially useful in those reactors where the ratio of flow through a sparger to the total liquid flow through the reactor's reaction zone exceeds 1 to 7.

For reactors having the same relative feedstock to total liquid flows, the benefits of the invention are expected to be more noticeable in configurations where the angle between the plane containing the sparger and the direction of overall liquid flow in the reactor vessel approaches ninety degrees, such as in the design shown in FIG. 1. As the included angle between the direction of the unwanted feedstock momentum component and the overall direction of liquid flow in the reactor changes from 90 degrees, the effect of the unwanted momentum component introduced into the reactor flow will be likely to decrease.

Spargers useful in the assembly can be of virtually any configuration. For example, the spargers can consist of multiple pipes, one or more rings, or a combination of the above. The sparger configuration is non-critical because any flow disturbances induced in the reactor by undesired feedstock momentum components can be reduced by proper orientation of the sparger assembly baffles.

Baffles employed in accordance with the present invention are believed to be particularly effective when oriented normal to the direction of flow through the inlet sparger assembly and parallel to the overall mass flow through the reactor as shown in FIGS. 3–6. Alternatively, baffles may be oriented at any angle of impingement which theoretically or empirically reduces an undesired momentum component of feedstock entering the reactor. Thus, the included angle between direction of the unwanted momentum component and baffle surface can be any angle less than 180 degrees, although angles which place baffles normal to the unwanted momentum component and/or forcing the flow in the direction of total liquid flow through the reactor are preferred.

The baffles need not be planar, as shown in FIGS. 3–6, but instead may be curved or contain a plurality of angled surfaces for damping or redirecting the undesired momentum component. For example, the baffles of FIGS. 3–6 could be quarter-circular curved plates for directing exiting fluid downwardly into the liquid mixing zone of the reactor, or could be corrugated surfaces which would tend to randomize and damp the undesired momentum component rather than redirecting that component downwardly.

The baffles may contain apertures of virtually any size, so long as sufficient surface area remains to interact with the undesired momentum component of the entering fluid, and the baffles need not be physically attached to the sparger arms or skirt as shown in FIGS. 2–5 as long as the baffle surface is located sufficiently near the exiting feedstock to interact with the undesired momentum component. The size of a baffle is non-critical, but it is preferred that at least fifty percent of the feedstock exiting a discharge aperture associated with that baffle impinges on the baffle.

Momentum-altering spargers in accordance with the present invention are most effectively used in systems where all fluids added to a liquid mixing region of the reactor are substantially devoid of momentum components which degrade the liquid velocity profile in the reactor. For example, in a reactor which recycles reactor fluids into the liquid mixing region, the recycled liquids preferably are introduced through a sparger in accordance with the present invention or in any other manner which prevents the introduction of unwanted recycle liquid momentum components, such as through a recycle or ebullation pump having symmetrically-oriented outlets. Any other fluid added to the region such as a soluble catalyst-containing liquid or a gas should be added in a similar manner if the momentum of the added fluid is sufficient to introduce velocity profile-degrading momentum components.

Spargers of the type discussed above are especially useful in the hydroconversion of relatively heavy hydrocarbonaceous feedstocks to relatively lighter products. Suitable feedstocks can be derived from naturally-occurring materials such as petroleum, coal, tar sands, and oil shales as well as waste plastics and waste streams from various petrochemical processes. Operating conditions generally should be at pressures from atmospheric to about 8000 psi, at hydrogen partial pressures ranging from 10 to 100 percent of the total pressure, and at temperatures ranging from about 200° to 1200° F.

Catalysts suitable for use in the hydroconversion processes include supported and oil-soluble, metal-containing catalysts. Suitable supported catalysts typically will comprise a hydrogenation metal such as nickel or cobalt and one or more promoters such as molybdenum which are deposited on a porous, refractory, inorganic oxide support. Suitable oil-soluble catalysts include virtually any metal-containing organic compound soluble in the feedstock which contains a hydrogenation metal. Preferred soluble catalysts include organophosphorodithioate compounds such as the lubricant Molyvan L available from the Vanderbilt Chemical Company of Norwalk, Conn.

If an oil-soluble catalyst is used, the catalyst may be added directly to the reactor or mixed with the feedstock at a location immediately upstream of the reactor. If a soluble catalyst is used, sufficient catalyst should be added to provide a molybdenum metal concentration in the feedstock/catalyst mixture of between about 20 and 1000 parts per million. If a supported catalyst is used, catalyst should be added in an amount of about 0.05 to 1.0 pounds of catalyst per barrel of feedstock.

Oil-soluble catalysts in accordance with the present invention are particularly well-suited to catalyzing the conversion of petroleum resids to lighter, more valuable products. As used in this application, the term "petroleum resid" or "resid" refers to feedstocks containing at least 50 weight percent of material boiling above about 650° F. at atmospheric pressure without regard for whether the feedstock is the product of a distillation process. Typically, resid will contain at least seventy weight percent of material boiling above about 1000° F. at atmospheric pressure and will be the bottoms product from one or more atmospheric or vacuum distillations.

When the feedstock is atmospheric or vacuum petroleum resid, the conversion preferably occurs in the presence of hydrogen gas at total pressures between about 200 and 8000 psi, at hydrogen partial pressures ranging from 20 to 95 percent of the total pressure, and at temperatures ranging from about 200° to 1200° F. More preferably, the conversion occurs at total pressures between about 1000 and 3000 psi at hydrogen partial pressures ranging from 20 to 95 percent of the total pressure and at temperatures between about 500° and 1000° F. Most preferably, the conversion occurs at total pressures between about 1500 and 2700 psi, at hydrogen partial pressures ranging from 50 to 95 percent of the total pressure and at temperatures between about 700° and 900° F. If a soluble or colloidal metal catalyst is used, catalyst concentration in the resid feedstock should be such as to provide between about 20 to 800 parts per million of molybdenum metal in the catalyst/resid mixture, and preferably between about 15 and 100 parts per million of molybdenum metal in the resid/feedstock mixture. If a supported catalyst is used, catalyst should be added in an amount of 0.1 to 0.5 pounds of catalyst per barrel of feedstock.

Many modifications can be made to the sparger and processes described above without departing from the spirit of the invention. The scope of the invention is therefore intended to be limited only by the following claims.

We claim:

1. A hydrotreating reactor comprising:
   a reactor vessel having a generally vertical axis of symmetry and upper and lower reactor half portions;
   recirculation means for recirculating a partially reacted liquid feedstock mixture within the reactor vessel;
   feedstock sparger means separate from said recirculation means and located within the lower reactor half portion for discharging feedstock into the vessel in at least two separate reactor locations through at least two sparger discharge apertures; and
   baffle means for reducing the magnitude of an undesired momentum component of feedstock discharged from the sparger means, the baffle means located such that discharged feedstock impinges on the baffle means.

2. The reactor of claim 1 wherein the reactor further includes a distributor plate located within the reactor lower half portion above the sparger means.

3. The reactor of claim 2 wherein the sparger means includes at least three discharge apertures defining a plane, said apertures opening in a direction generally normal to the plane, and wherein the baffle means includes a plurality of baffle plates for reducing an undesired momentum component of discharged feedstock which is generally parallel to the plane, said baffles oriented in a direction generally perpendicular to the plane.

4. The reactor of claim 3 wherein the sparger means includes a pair of sparger arms having a plurality of discharge apertures located in a generally symmetric fashion around a reactor axis of vertical symmetry.

5. The reactor of claim 4 further including means for recirculating reactor liquids from the upper reactor half portion to the lower reactor half portion.

6. The reactor of claim 1 wherein the recirculation means includes baffle means for reducing the magnitude of an undesired momentum component of the partially reacted feedstock mixture discharged from feedstock discharged from the recirculation means.

7. The reactor of claim 1 further including skirt means at least partially surrounding said sparger means for distributing a gas discharged by the sparger means.

8. The reactor of claim 7 wherein the baffle means is attached to the skirt means.

9. The reactor of claim 8 wherein the baffle means is attached to the skirt means and the feedstock sparger means.

10. The reactor of claim 1 wherein the baffle means is attached to the feedstock sparger means.

11. A hydrotreating reactor comprising:
    a reactor vessel having a generally vertical axis of symmetry and upper and lower reactor half portions;
    recirculation means for recirculating a partially reacted liquid feedstock mixture within the reactor vessel, said recirculation means comprising a downcomer, a recirculation pump, and a recirculation pump discharge located within the reactor vessel;
    at least one feedstock sparger separate from said recirculation means, said sparger being located within the lower reactor half portion, and having two physically separate sparger discharge apertures for discharging feedstock into the vessel in at least two separate reactor locations; and
    at least two baffles located sufficiently near the two separate reactor locations that discharged feedstock impinges on the at least two baffles to reduce the magnitude of an undesired momentum component of feedstock discharged from the feedstock sparger.

12. The reactor of claim 11 further including at least three discharge apertures defining a plane and wherein said apertures are oriented to discharge feedstock against the at least two baffles, said at least two baffles being oriented nonparallel to said plane.

13. The reactor of claim 12 wherein the recirculation means further includes baffles located adjacent the recirculation pump discharge to alter the direction of momentum of the mixture exitting the recirculation pump discharge.

14. The reactor of claim 11 further including at least two sparger arms located within the reactor half portion, each of said sparger arms having a plurality of discharge apertures, and said discharge aperatures being located generally symetrically about the vertical axis of symmetry.

15. The reactor of claim 14 in which said discharge apertures are oriented to direct feedstock downwardly, and further including a skirt having an open bottom surrounding at least a portion of said at least two sparger arms.

16. The reactor of claim 15 wherein said baffles are attached to said skirt.

17. The reactor of claim 16 wherein said baffles are oriented generally vertically to reduce an undesired nonvertical momentum component of discharged feedstock.

\* \* \* \* \*